P. T. Gates.
Collar.

No. 2300. Reissued. July 10 1866.

Witnesses.
M. M. Lincoln
James T. Graham

Inventor.
P. T. Gates

UNITED STATES PATENT OFFICE.

P. TENNEY GATES, OF PLATTSBURG, NEW YORK.

IMPROVEMENT IN WRISTBANDS.

Specification forming part of Letters Patent No. 53,134, dated March 13, 1866; Reissue No. 2,300, dated July 10, 1866.

*To all whom it may concern:*

Be it known that I, P. TENNEY GATES, of Plattsburg, in the county of Clinton and State of New York, have invented a new and Improved Detached Reversible Wristband and Adjuster; and I do hereby declare that the following is a full, clear, and exact description thereof, which will enable others skilled in the art to make and use the same, reference being had to the accompanying drawings, forming part of this specification, in which—

Figure 1:
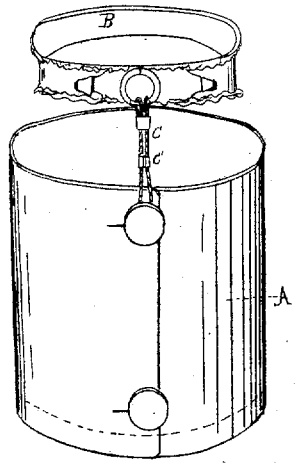
Figure 2:
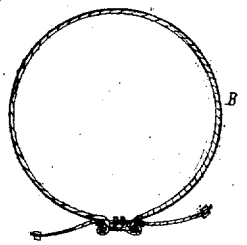

Figure 1 is a perspective view of my improved wristband or cuff, and showing the elastic wristlet, and by which it is attached to the arm. Fig. 2 is a section taken through the center of the elastic wristlet.

My invention has for its object to furnish a cuff or wristband wholly detached from the shirt or other garment, which is also reversible, being capable of being worn either end downward, and which is adjustably attached to the arm by an elastic wristlet and loop.

The invention consists, first, of a reversible cuff or wristband, and, secondly, of the elastic wristlet and loop.

A is the body of the cuff or wristband. This should be of about the same size at both ends, and both the side edges should be finished as the lower edges of wristbands are ordinarily finished, so that it may be worn with either end toward the hand with equal facility.

The wristband A should be of such a size that it will easily pass over the hand when closed or buttoned, and it may be closed by having its ends sewed fast to each other, buttons being attached to it, if desired, or the ends may be secured to each other by buttons, sleeve-buttons, studs, or by any of the ordinary ways in which wristbands are now commonly secured around the wrist.

The wristband may be made of cloth, paper, or any other suitable material.

B is the elastic band or strap by means of which the waistband A is adjusted and secured to the arm.

The elastic wristlet B may be made of a strip of ordinary elastic or its equivalent, and may have its ends secured by small metallic caps, as shown in the drawings, or in any other convenient way to prevent them from raveling.

To render this band adjustable its two ends are passed up through two rings. They are then turned in opposite directions over the upper ring and passed under or through the lower ring and drawn through the rings until the size of the band has been adjusted to the size of the arm upon which it is designed to be worn. By slipping the rings close together the ends of the band are held firmly in place.

Any other mode of adjustment of the length of the wristlet may be adopted.

For the loop C, by which the cuff A is connected to the elastic band B, I prefer a piece of elastic cord, the two ends of which are passed around one of the rings that secure the ends of the band B, and are then secured together and to the body of the cord by a metallic clasp, as shown in Fig. 1; but other means may be used to accomplish the same result, and the loop may be non-elastic, or the cuff may be attached by a flap from the wristlet.

*c'* is a small slide slipped upon the loop and designed to be pushed down toward the button of the wristband, around which the loop is passed to secure the said wristband from becoming accidentally detached.

The loop C may be connected to the rings of the band B by a metallic clasp passing around one of the rings and clamping the ends of the loop between the ends and turned-over edges of the said clasp. This latter method I prefer.

The elastic loop may be replaced by a non-elastic strap or cord, if desired, the precise means of connection being immaterial so long as it is a detachable connection between the elastic wristlet B and the cuff or wristband A, which several names denote the same article.

What I claim as new, and desire to secure by Letters Patent, is—

1. An elastic wristlet or adjuster, in combination with a pendent cuff of any description connected to the wristlet by elastic cord or otherwise.

2. A wristband or cuff having both ends finished and buttonholed, and thus adapted for reversing when unattached to any other garment, and arranged substantially as described, and for the purpose set forth.

3. A cuff pendent from an attachment on the arm, substantially as and for the purpose set forth.

P. TENNEY GATES.

Witnesses:
E. HATHAWAY,
F. F. HATHAWAY.